(12) United States Patent
Stillwell et al.

(10) Patent No.: US 11,964,609 B2
(45) Date of Patent: Apr. 23, 2024

(54) LIGHTING SYSTEM FOR TRUCK AND TRAILER MOUNTED VEHICLES

(71) Applicants: Adam K. Stillwell, Junction City, OH (US); Chris E. Stillwell, Orient, OH (US)

(72) Inventors: Adam K. Stillwell, Junction City, OH (US); Chris E. Stillwell, Orient, OH (US)

(*) Notice: Subject to any disclaimer, the term of this patent is extended or adjusted under 35 U.S.C. 154(b) by 53 days.

(21) Appl. No.: 17/954,024

(22) Filed: Sep. 27, 2022

(65) Prior Publication Data

US 2023/0102824 A1 Mar. 30, 2023

Related U.S. Application Data

(60) Provisional application No. 63/248,699, filed on Sep. 27, 2021.

(51) Int. Cl.
*B60Q 1/30* (2006.01)
*B60Q 1/26* (2006.01)
*B60Q 1/34* (2006.01)
*B60Q 1/44* (2006.01)
*H05B 47/19* (2020.01)

(52) U.S. Cl.
CPC ........... *B60Q 1/305* (2013.01); *B60Q 1/2615* (2013.01); *B60Q 1/34* (2013.01); *B60Q 1/44* (2013.01); *H05B 47/19* (2020.01)

(58) Field of Classification Search
CPC ........ B60Q 1/305; B60Q 1/2615; B60Q 1/34; B60Q 1/44; B60Q 2900/30; H05B 47/19
See application file for complete search history.

(56) References Cited

U.S. PATENT DOCUMENTS

| | | |
|---|---|---|
| 4,859,982 A | 8/1989 | Seaburg |
| 5,424,715 A | 6/1995 | Lietzow et al. |
| 5,666,103 A | 9/1997 | Davis, Jr. |
| 6,100,801 A | 8/2000 | Plummer |
| 6,847,863 B2 | 1/2005 | Lamke et al. |
| 7,026,919 B2 | 4/2006 | Perlman et al. |
| 7,199,705 B1 | 4/2007 | Mixon |

(Continued)

FOREIGN PATENT DOCUMENTS

WO  WO-2014152004 A1 * 9/2014  ............ B60L 53/12

*Primary Examiner* — Abdullah A Riyami
*Assistant Examiner* — Syed M Kaiser
(74) *Attorney, Agent, or Firm* — Jason H. Foster; Kremblas & Foster

(57) ABSTRACT

A wireless lighting system used with demountable equipment, including truck-mounted forklifts (TMFL). The system includes a transmitter installed in a lighting harness or trailer lighting socket on a transporting vehicle. When the transporting vehicle's notification lights or signals (turn signals, tail lights, brake lights, clearance lights, reverse lights) are activated, a wireless signal is transmitted to a wireless receiver located on the TMFL, and a corresponding light or lights are activated on the TMFL. The system utilizes the power source of the TMFL to power the notification lights of the TMFL while being transported. Further, when the forklift is dismounted and in operation, the wireless lighting system is disabled until the forklift is returned to the transport position on the transport vehicle. This prevents actuation of the lights on the forklift unless the forklift is on the transport vehicle.

10 Claims, 7 Drawing Sheets

(56) References Cited

U.S. PATENT DOCUMENTS

| | | | |
|---|---|---|---|
| 7,557,699 B2 | 7/2009 | Walton | |
| 7,973,651 B2 | 7/2011 | Stiles et al. | |
| 8,061,879 B2 | 11/2011 | Simmons et al. | |
| 9,272,663 B2 | 3/2016 | Smith et al. | |
| 9,318,922 B2 * | 4/2016 | Hall | H02J 50/70 |
| 9,834,133 B2 | 12/2017 | Bean | |
| 2005/0258947 A1 | 11/2005 | Kunianski | |
| 2006/0238317 A1 | 10/2006 | Colledge | |
| 2008/0258932 A1 * | 10/2008 | Oelrich | B60Q 1/48 340/901 |
| 2009/0115630 A1 * | 5/2009 | Oelrich | G08G 1/0962 340/901 |
| 2009/0219148 A1 | 9/2009 | Thomas et al. | |
| 2012/0191270 A1 | 7/2012 | Floyd | |
| 2012/0313793 A1 * | 12/2012 | Huguenot | B60Q 1/545 340/908 |
| 2013/0221744 A1 * | 8/2013 | Hall | H03H 7/40 307/9.1 |
| 2013/0264941 A1 | 10/2013 | Osherov | |
| 2015/0379872 A1 * | 12/2015 | Al-Qaneei | B60Q 1/545 340/905 |
| 2016/0207451 A1 | 7/2016 | Orazem | |
| 2017/0080852 A1 | 3/2017 | Shanahan et al. | |
| 2017/0257934 A1 * | 9/2017 | Garvey | G08G 1/162 |
| 2019/0315170 A1 | 10/2019 | Williams | |
| 2019/0315268 A1 * | 10/2019 | Garvey | H04M 1/72412 |
| 2021/0156536 A1 * | 5/2021 | Adams | B60Q 1/143 |

\* cited by examiner

LIGHTING SYSTEM FOR TRUCK AND TRAILER MOUNTED VEHICLES

FIELD AND BACKGROUND OF THE INVENTION

The present invention relates generally to trucks and/or trailers that transport demountable and independent vehicles, which may be truck or trailer mounted forklifts. The invention relates more specifically to a fully integrated wireless lighting system that connects the transported and the transporting vehicles' lighting systems.

A truck-mounted forklift, also known as a "TMFL," a "piggyback forklift," and an "all-terrain forklift," is a vehicle that can traverse uneven and rough terrain while carrying a payload. Such a forklift may be used in a variety of construction and other environments because it has large tires that permit it to transport building materials over loose soil, sand or gravel. A truck and a frame-mounted trailer, or a trailer that is towed by a truck (e.g., a tractor-trailer), may be combined with an attached forklift that is demountable upon reaching a construction site.

The combination of a transport vehicle (e.g., a tractor-trailer) and the demountable vehicle (TMFL) is a compact and efficient tool for transporting and precisely placing heavy payloads. One example of this is used when transporting roof shingles, which may be placed on pallets on the trailer bed, from a supply location to a construction site. Upon arrival, the driver of the truck may remove and operate the demountable forklift to remove the pallets of shingles from the bed and precisely place them at the work site without maneuvering the large truck in rough terrain, an already completed landscape, or a tight area in which the truck cannot maneuver.

Regardless of the type of trailer, the combination typically includes a payload-carrying bed to which an all-terrain forklift is attached, typically in the rear of the bed by inserting the forklift's forks into pockets on the back of the bed. The forklift may be secured to the trailer with hooks, chains, or other fasteners. The forklift raises itself up and down into and out of a stowed position using the forklift's hydraulic system that is also used to raise and lower pallets of materials. As the truck transports the payload and the forklift to a site, the forklift does not shift significantly or fall off of the truck due to chains, hooks and other fasteners. Examples of such combinations of trucks, trailers and forklifts are shown in FIGS. 1-4, including Moffett, Princeton and Piggyback brands.

The bed of the prior art truck or trailer is typically a flatbed style that carries construction or other material to a job site or a warehouse. Upon arrival at the job site or warehouse, the forklift is detached from the bed to work independently of the truck, for example to load and unload material on or off the bed. This permits maximum maneuverability of the powerful forklift to avoid people carrying the material. Forklifts are much smaller than the truck and trailer and are more maneuverable due to a very small turning radius.

A truck mounted forklift in the stowed position on the trailer is normally adjacent the trailer's existing tail lights. The TMFL is large enough to block at least some of the tail lights in that position. Therefore, manufacturers of TMFLs build into them a fully integrated tail light system that is designed to supplant the trailer's tail light system due to the TMFL obscuring the trailer's tail lights. The current industry standard for the TMFL involves a direct mechanical cord 2 ("pig tail") plugged into the TMFL and the transport vehicle's lighting system to integrate the two lighting systems during travel (see FIG. 4). This permits the transport vehicle to meet Department of Transportation (DOT) regulations for highway passage. This cord 2 must be manually connected and disconnected each time the forklift is added to or removed from its mounting position on the transport vehicle. Often the driver forgets to disconnect the cord 2 and destroys it (and potentially the wiring harnesses of the forklift and the transport vehicle) during de-mounting. This error may leave the driver unable to drive the forklift and/or transport vehicle due to strict regulations for such vehicles. This requires an emergency service call for a repair technician to repair the damage so the driver can complete his work. Furthermore, this cord 2 is similar to any vehicle-to-trailer, hard-wired connection, inasmuch as it can become damaged over time due to exposure to rain, salt, road grit and other debris as can be seen from its location behind a trailer tire in FIG. 4. The wires can also be inadvertently pulled away from the transport vehicle, become corroded or otherwise damaged during the mounting and dismounting of the equipment from the transport vehicle and thereby fail to work while transporting and require maintenance or replacement. The conventional setup, which includes a wired connection between the transport vehicle's lighting system and the lights on the demountable vehicle, has disadvantages.

Besides an OEM (original equipment manufacturer) hard-wired lighting system, there are products currently used in the unaffiliated industry of emergency towing, e.g., tow trucks, such as the TowMate brand product (towmate.com) as shown in FIGS. 5 and 6. These products provide a non-integrated, temporary wireless tail light, blinker and brake light that only operate the lighting system for forward moving applications. This product does not have any of the back-up light functions required by DOT or by OSHA as required on construction sites and function as described in U.S. Pat. No. 6,100,801. There are other products that are competitors to TowMate with essentially the same functionality. The lights in these devices are powered by a battery in a light bar that must be temporarily attached to the vehicle, and the battery must be periodically recharged or replaced. These products do not contain a "backup" lighting system, which is a critical safety requirement to meet DOT and OSHA regulations.

SUMMARY OF THE INVENTION

Disclosed herein is an apparatus connecting a lighting system for rearwardly-facing lights on a first vehicle to a lighting system for rearwardly-facing lights on a second vehicle. The first vehicle supports the weight of the second vehicle and at least a portion of the second vehicle blocks at least one rearwardly-facing light of the first vehicle. The apparatus comprises a wireless transmitter electrically connected to the lighting system of the first vehicle. The apparatus also comprises a wireless receiver electrically connected to the lighting system of the second vehicle and an electrical power supply of the second vehicle. The wireless transmitter is configured to transmit a wireless signal to the wireless receiver when the at least one rearwardly-facing light of the first vehicle is actuated to light. The wireless signal uniquely identifies the at least one rearwardly-facing light of the first vehicle. The wireless receiver is configured to, upon receipt of the wireless signal, electrically connect the power supply of the second vehicle to a rearwardly-facing light on the second vehicle that corresponds to the at least one rearwardly-facing light of the first vehicle. In some embodiments, the wireless transmitter is contained in a housing that is disposed in a trailer lighting socket on the first vehicle.

Disclosed herein is a system that permits a driver of a transport vehicle to wirelessly activate the lights of the demountable equipment (e.g., the forklift) when the forklift is being transported by the transport vehicle. The lights of the forklift serve as the rear lights for the transport vehicle, thus eliminating the need for any wired connection between the transport vehicle and the forklift, or for any change in the lights on the truck or trailer bed.

Truck mounted forklifts may be transported over highways and other roadways more readily by transport vehicles using the herein-disclosed devices. Common examples of truck mounted forklifts (TMFLs) include the following brands: Moffett M8 and M4, Manitou TMT 55, Princeton PB70, Navigator RT-4000 and Prowler.

The wireless light system eliminates the need for cords or wires to be connected between the transport vehicle and the demountable vehicle equipment. The wireless light system also increases the safety and efficiency of the equipment over removable hard-wired cables by reducing the time and steps required for mounting and dismounting the equipment from the transport vehicle and eliminating the opportunity for damage or destruction to the wired system caused by a failure to remove the wired connection upon demounting the vehicle.

The wireless light system overcomes the limitations and disadvantages of prior systems and provides a number of significant advantages. It is an object of the present invention to provide a demountable equipment wireless lighting system that is simple in design and simple to manufacture and use. It is an object of this invention to provide a means to eliminate the use of wires or connections from the transport vehicle to the transported, demountable equipment. It is an object of this invention to provide an effective and reliable means of transmitting signals from the transport vehicle to the transported equipment. More specifically, it is an object of this invention to provide wireless communication to activate back up lights on transported equipment which is not available in the market today.

In accordance with the present invention, when the transported forklift is attached to the transporting vehicle, the transmitter connected to the transporting vehicle's lighting system transmits signals to the receiver in a box or other container powered by, and attached to, the transported (forklift) power system. Alternatively, when the transported forklift is attached to the transporting vehicle, a proximity sensor on the transporting vehicle detects that the transported forklift has been mounted to the transporting vehicle. This detection results in a signal to the transmitter connected to the transporting vehicle's lighting system to transmit signals to the receiver in a box or other container powered by, and attached to, the transported (forklift) power system. In these circumstances, this thereby powers lights on the forklift when the corresponding lights on the transporting vehicle are powered. Thus, the transporting vehicle's lighting system transmits wirelessly to a receiver in the forklift to light up the corresponding lights on the forklift. This includes brake lights, running lights, turn signal lights, and reverse light(s). The transmitter installed on the transporting vehicle sends wireless signals to the receiver mounted on the transported vehicle (forklift), which in turn activates the various lights of the forklift, including stop lights, tail lights, clearance lights, turn signals, and reverse/back-up lights, if equipped. The disclosed design does not use a hard-wired connection between the transporting vehicle and the transported equipment, but instead uses a wireless connection.

The receiver and transmitter are designed and constructed for permanent installation on the transported equipment (e.g., forklift) with bypass capabilities without modification or intervention of the user. For example, the bypass may be established when the transported vehicle is away from the transport vehicle. In case of fault, damage, misuse, or failure of the transmitter or the receiver, the transported equipment can use corded lighting power from the transport vehicle as in conventional configurations for further transport until the faulty component can be repaired or replaced.

The disclosed, functional design solves multiple problems with the current designs of this type of demountable vehicle. It also provides a substantially enhanced function using a wireless lighting system that is superior to conventional lighting systems, such as those described in U.S. Pat. No. 6,100,801, that only provide limited automotive signal functions and do not meet OSHA construction job site safety standards. The systems described in U.S. Pat. No. 6,100,801 also have the disadvantage of a rechargeable battery burden. In addition, the conventional systems that manufacturers of TMFLs use today have a high probability of hard wired cable failure due to lack of maintenance and carelessness, along with frequent and substantial replacement costs, delay and poor safety performance when the failure occurs in remote areas and require driver mechanical interface when unmounting and mounting the TMFL where the functional design is fully automatic.

Figure 1:
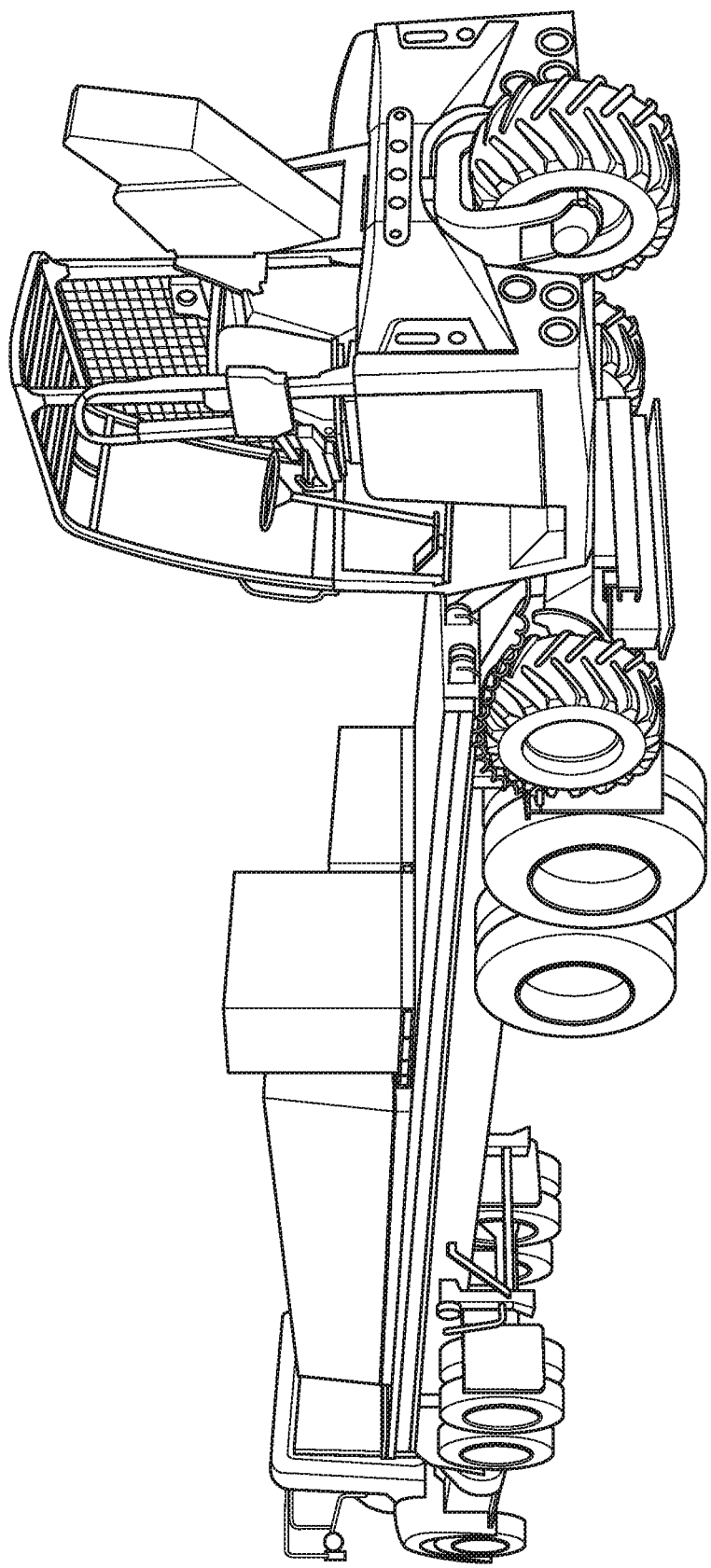
FIG. 1 is a view in perspective illustrating a prior art truck-mounted forklift in place on a trailer of a transport vehicle (a tractor-trailer rig).
Figure 2:
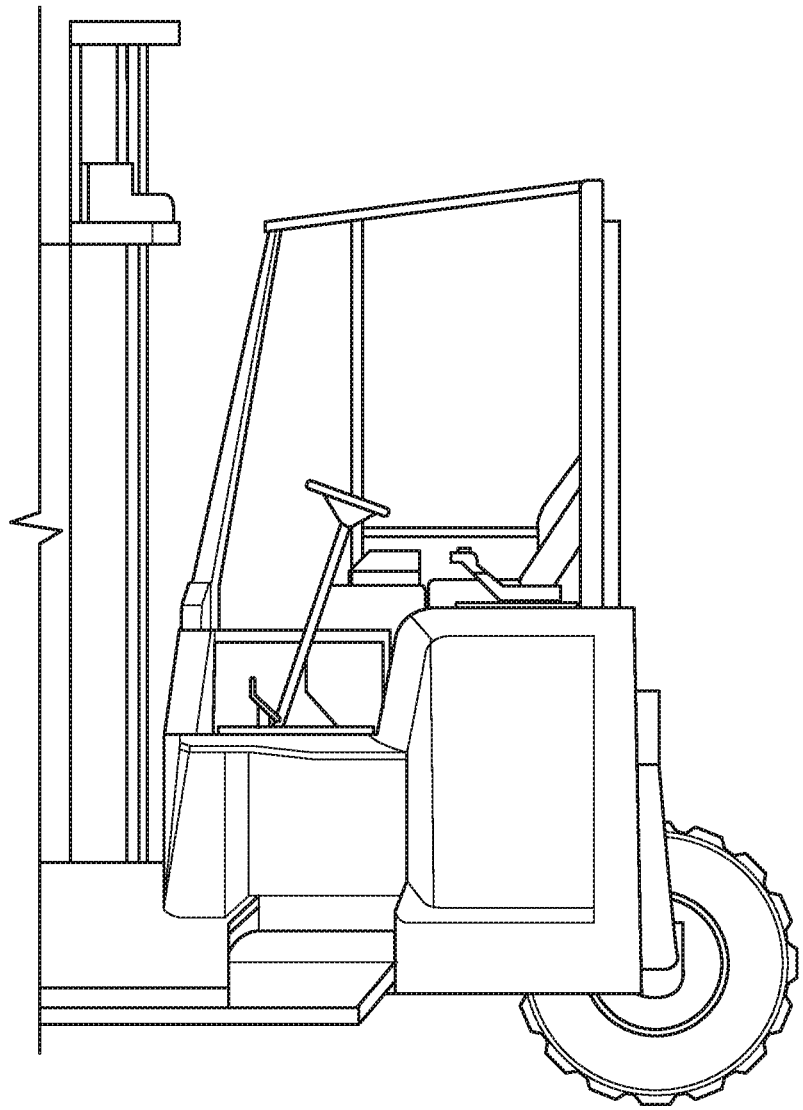
FIG. 2 is a side view illustrating a prior art truck-mounted forklift in an operable position on a trailer.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

Figure 7:
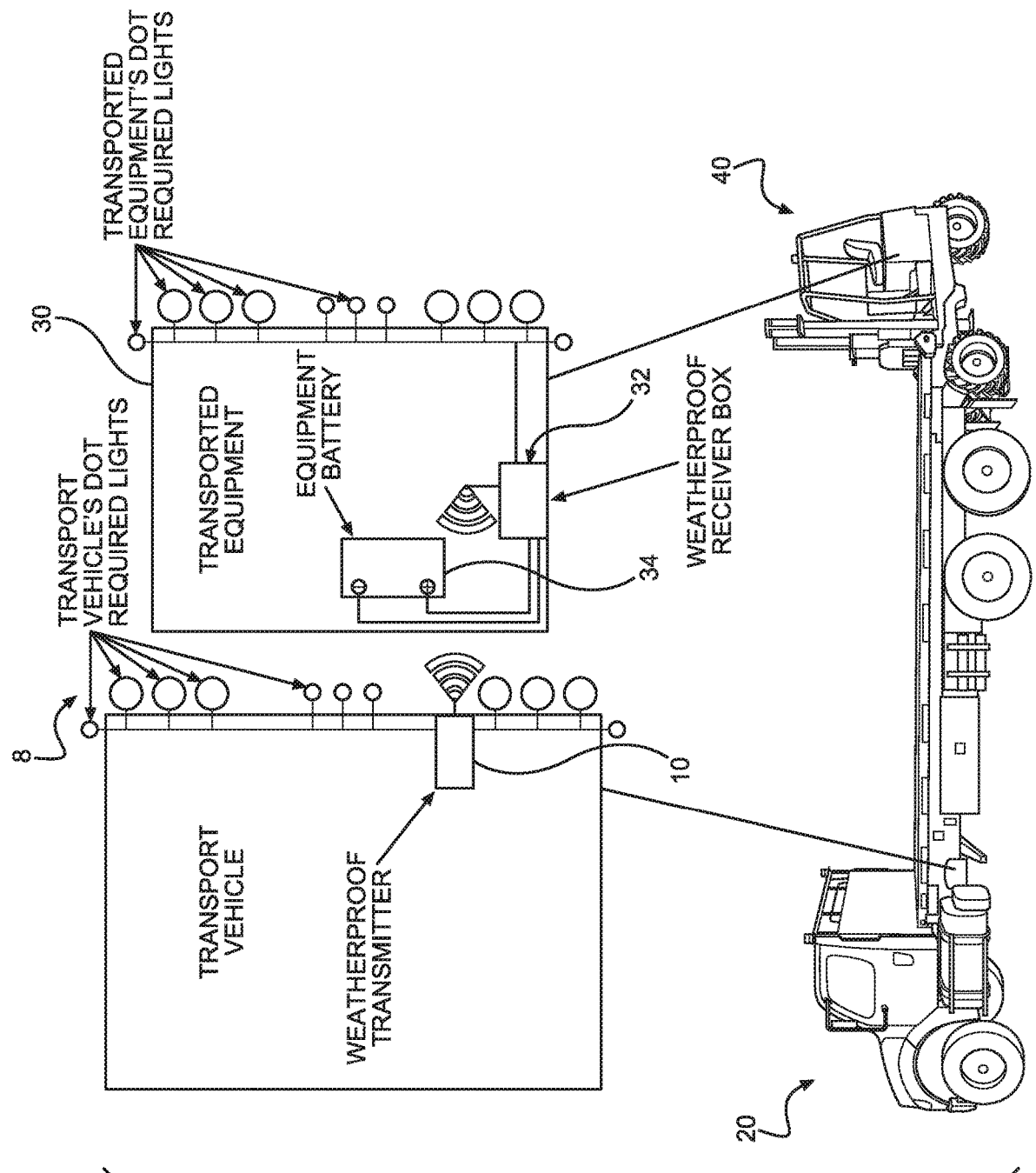
FIG. 7 is a schematic view illustrating a first embodiment including the transport vehicle lighting system and the transported equipment lighting system.

The transport (also referred to as "transporting") vehicle 20 is shown in FIG. 7 and may be any vehicle that is able to transport a TMFL or any transported vehicle similar to TMFLs described herein. The transport vehicle 20 may be a heavy duty truck with a non-removable, rigidly attached flatbed as shown in FIG. 7. Another example of a transport vehicle is a vehicle and trailer combination, such as a conventional semi-tractor with a detachable trailer shown in FIG. 1. Transport vehicles that are capable of transporting a TMFL have subcomponents, and these subcomponents are considered a part of the transport vehicle. For example, a socket 36 (FIG. 9) that is a component of the transport vehicle's 20 lighting system is a part of the transport vehicle 20. When the transport vehicle includes a semi-tractor and a trailer having a bed to which the TMFL mounts, the trailer is included as a component of the transport vehicle. Thus, the temporarily attached trailer of a transport vehicle is considered a portion of the transport vehicle.

Transport vehicles are commercial vehicles that are required to have warning or safety lights facing rearwardly, which is defined herein as facing in a generally rearward direction so that a driver in a vehicle directly behind the transport vehicle, and a driver in a vehicle to the rear of the transport vehicle but laterally of directly behind, can readily view the warning or safety lights when the transport vehicle lights them. For example, brake lights are rearwardly-facing lights that are typically red, and brake lights light up when the operator of the transport vehicle presses the brake pedal by the power source in the transport vehicle being connected to the brake light bulbs. These can be seen from directly behind and behind but not directly, such as in an adjacent lane of a highway. Turn signals are yellow lights that light up, typically intermittently, when the operator of the transport vehicle actuates a switch, which is often a stalk on the steering column that is pressed in an upward or downward direction for different direction lights. Therefore, rearwardly-facing lights on a transport vehicle typically include any lights that can be viewed from vehicles to the rear of the transport vehicle, so long as there is not a structure blocking the rearwardly-facing lights.

Figure 3:
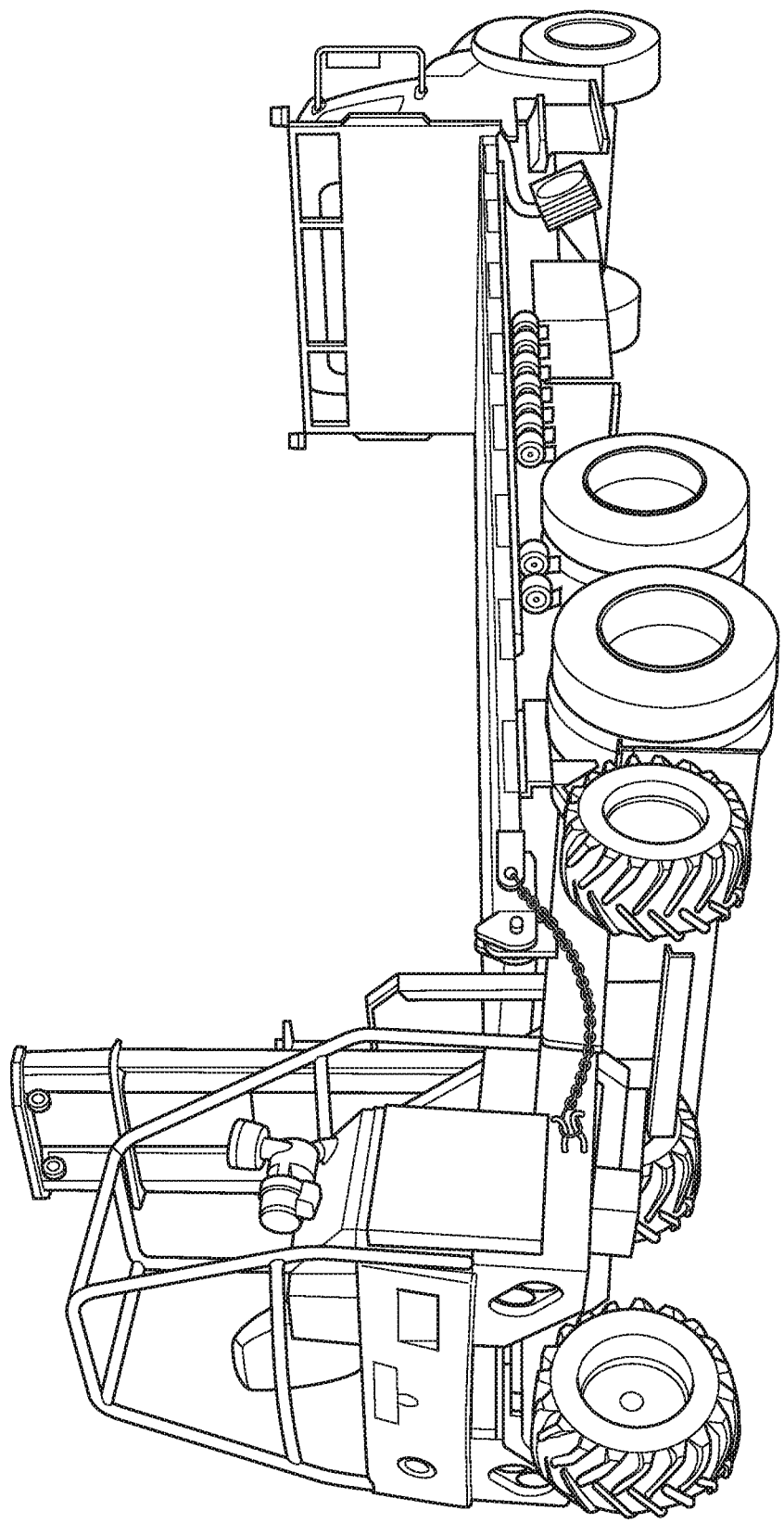
FIG. 3 is a view in perspective illustrating a prior art truck-mounted forklift in an operable position on a truck's frame-mounted trailer.
Figure 4:
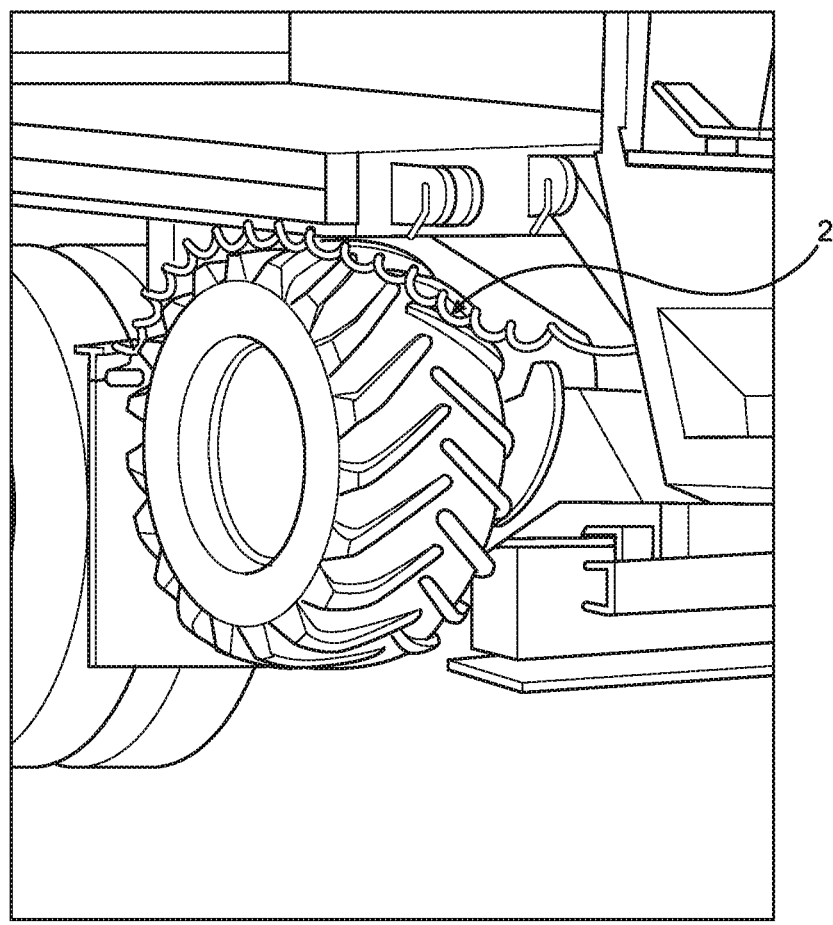
FIG. 4 is a magnified view in perspective illustrating the location of wires extending from a forklift to a trailer in a prior art configuration.
Figure 5:
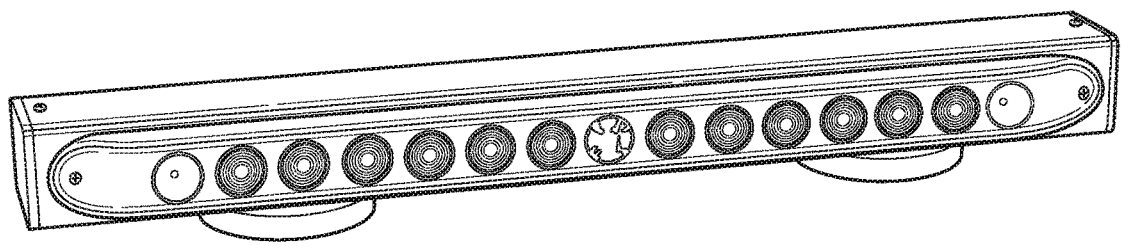
FIG. 5 is a view in perspective illustrating a prior art light bar.
Figure 6:
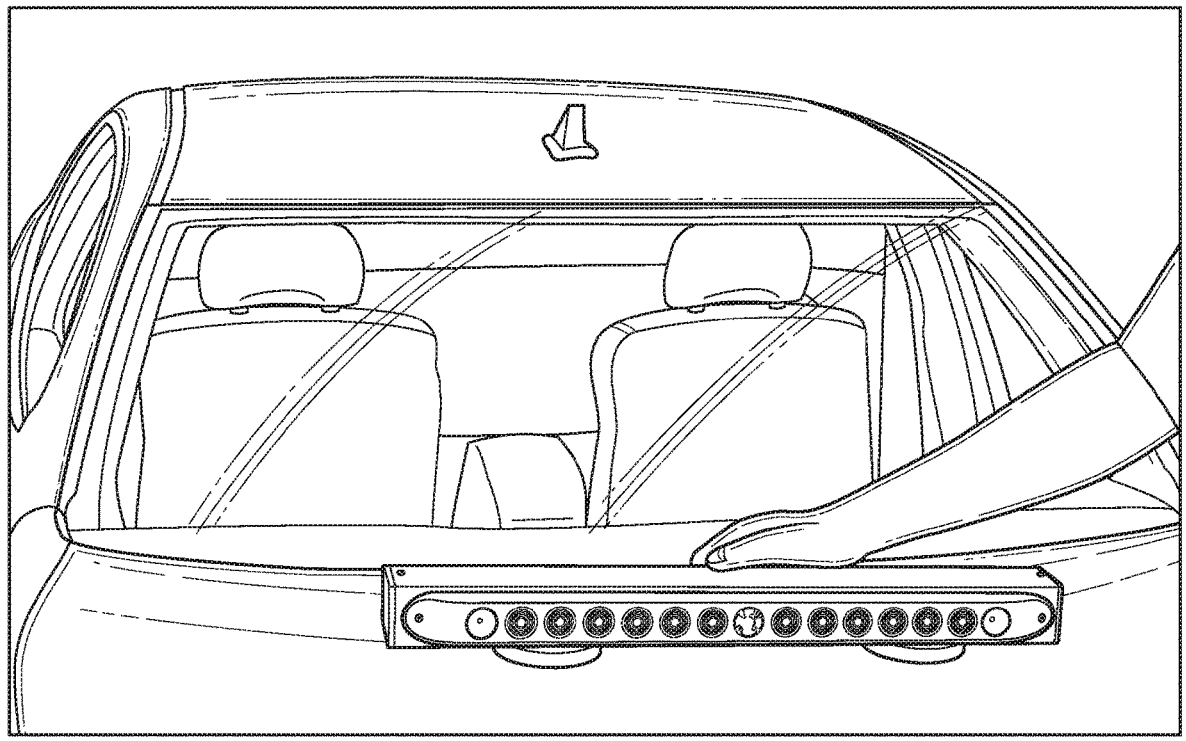
FIG. 6 is a rear view illustrating the prior art light bar of FIG. 5 in a typical configuration on a vehicle.

When a TMFL is in place on a transport vehicle, the TMFL typically is placed over one or more of the rearwardly-facing lights. Typically, the TMFL blocks all of the rearwardly-facing lights. By "blocks" (and other similar terms), it is meant that the blocked light is not readily visible to drivers positioned to the rear of the transport vehicle who are otherwise in a position to view and notice the light. Blocking does not mean that no light is visible at all from any angle or location. Some light will likely be visible from some angles when a rearwardly-facing light is "blocked." However, a TMFL blocking the lights of the transport vehicle make the lights not readily visible, according to U.S. Department of Transportation and OSHA regulations, to a driver who is, but for the TMFL, otherwise in a position to see the lights. When the TMFL is in place on a transport vehicle, as shown in FIG. 3, at least a portion of the TMFL blocks at least one of the rearwardly-facing lights of the transport vehicle. It is common for all rearwardly-facing lights of the transport vehicle to be blocked by the TMFL, but this is not always the case.

The TMFL has all of its weight supported by the transport vehicle. Typically the wheels and tires of the TMFL are not in contact with, and are spaced at least a few inches (and preferably a few feet), above the surface upon which the wheels and tires of the transport vehicle rest. In this manner, the transport vehicle supports the weight of the TMFL during transport.

The transport/transporting vehicle 20 thus "carries" and supports entirely the transported vehicle 40 during transport. The configuration referred to as "towing" is distinguished from "transporting" inasmuch as a towed vehicle either contacts the ground on which the towing vehicle is driving, or rests upon a set of wheels (i.e., a "dolly") that rests upon the ground on which the towing vehicle is driving. When transporting a vehicle, the transported vehicle does not touch the ground upon which the transporting vehicle is driving. The forks of a forklift are inserted into the rear of the trailer when the forklift is resting on the ground, and then the forklift is raised up using its own hydraulic or other lifting system and raises the wheels of the forklift well above the ground. Upon lifting the forklift to this position, the rear lights of the transport vehicle are blocked by the forklift.

Figure 9:
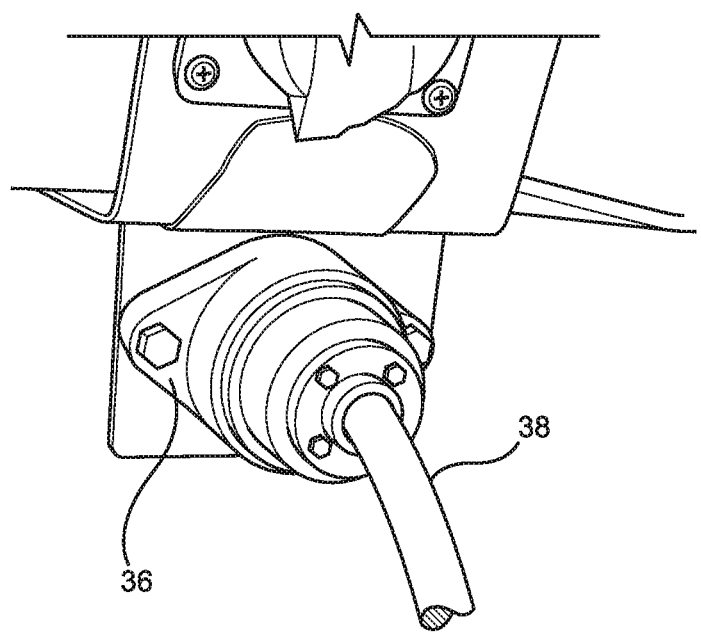
FIG. 9 is a view in perspective illustrating a conventional trailer light socket with a transmitter power cord attached thereto.

FIG. 7 shows a transmitter 10 that is a component of a wireless light signaling apparatus 8 according to the invention. The transmitter 10 is mounted on or to the transport vehicle 20 as shown schematically. The transmitter 10 may be enclosed in a housing that is mounted to the conventional socket 36 on the transport vehicle into which trailer lights may be connected, as shown in FIG. 9, as a "plug and play" option. The transmitter 10 may be enclosed in a housing that has a male end that is inserted into the female socket 36 in place of a conventional trailer light wire so that all of the components of the wireless light signaling apparatus 8 that are attached to the transport vehicle 20 may be located in the housing at the socket 36. Alternatively, the transmitter 10 may be fully integrated into the transport vehicle's lighting system as a standard feature with the conventional socket 36 available as an emergency backup. As another of many alternatives, the transmitter 10 may be mounted elsewhere on the transport vehicle 20 (e.g., in a housing that is spaced from the socket 36) and may be connected by wire 38 to the trailer light socket 36, as shown in FIG. 9. Still further, the transmitter 10 may be mounted elsewhere on the transport vehicle 20 and may be connected wirelessly to a transceiver that is attached to the trailer light socket 36. In general, the transmitter 10 is mounted on the transport vehicle 20 within wireless range of the TMFL that is mounted to the transport vehicle 20 when the transport vehicle 20 is operating to transport the TMFL.

The wireless signal transmitter 10 may be connected to a conventional wiring harness (not illustrated but well known) or the socket 36 of the transport vehicle's 20 trailer lighting output. A preferred example is simply plugging a male plug at one end of the housing in which the transmitter 20 is enclosed into the multi-prong female socket 36 of the transport vehicle 20 where the conventional hard-wired lighting system would otherwise plug into. This connection causes the transmitter 10 to receive the lighting signals from the transport vehicle 20. An alternative connection may be to hard-wire the wireless signal transmitter 10 to the computer of the transport vehicle 20, the fuses of the transport vehicle 20, the lighting wiring of the transport vehicle 20 or any other suitable system or location on the transport vehicle 20. Because the above-described preferred embodiment does not disable the transport vehicle's 20 trailer lighting system, in case of fault, defect or failure of the wireless light system this embodiment of the invention retains the capability of "bypassing" the wireless system to continue safe transport of the TMFL using a conventional wired connection between the socket 36 and the TMFL.

The signals transmitted by the wireless transmitter 10 regarding activation of lights of the transport vehicle 20 are preferably unique to particular lights of the transport vehicle. For example, it is contemplated that each of the brake lights, left turn signal, right turn signal, tail lights and reverse lights has a signal that uniquely identifies the corresponding light that is then transmitted by the wireless signal transmitter 10 to a wireless receiver 32 described below. The wireless receiver 32 actuates a corresponding rearwardly-facing light on the transported equipment 40 as explained below.

The transported equipment 40, such as a TMFL, is shown in FIG. 7 in position on the transporting vehicle 20. The receiver 32 shown above the TMFL is another component of the wireless light-signaling apparatus 8 and is mounted to the transported equipment 40, as shown schematically, such as in the engine compartment. The receiver 32 is electrically connected to the power source of the transported equipment 40, such as the battery 34, and is preferably electrically connected to the lights and/or lighting system of the transported equipment 40. Actuators may be included and connected to the receiver for actuating the lights of the transported equipment 40 when a signal is received from the transmitter 10. The actuators may be switches that are changed from one state (e.g., on) to another state (e.g., off) upon a signal being received from the transmitter 10. Thus, when the transmitter 10 transmits an appropriate signal, the receiver 32 receives the signal and an actuator for the corresponding light or lights on the transported equipment 40 is actuated. For example, the transmitter 10 may transmit a unique signal that is associated with the left turn signal. In that situation, the receiver 32 receives the unique wirelessly-transmitted signal and actuates the left turn signal light or lights on the transported equipment 40. A signal to turn off the turn signal may follow and the left turn signal is then turned off, or the signal from the transmitter continues until the turn signal in the transporting vehicle 20 ceases operation.

In some embodiments, the receiver 32 is mounted in a container 30, which may be a weatherproof box, and which may be mounted in the engine or utility compartment of the transported equipment 40. This location permits the receiver 32 to be readily connected to the power source of the transported equipment, such as the battery 34 of the transported equipment 40. This connection of the receiver 32 to the battery 34 permits the components on the transported equipment 40 to use the power supply (e.g., automotive style 12 volt battery) and lights of the transported equipment 40, thereby avoiding the need to charge or replace a separate battery. Thus, the preferred power supply for the lights of the transported equipment 40 is the battery 34 of the TMFL that is used to power the starting motor of the engine in the TMFL, and is charged whenever the engine of the TMFL is operating. It is contemplated that the TMFL may be an electric vehicle (EV) with a plurality of batteries or other power sources, in which case the person of ordinary skill will understand the best power source to use.

The battery of a typical TMFL is charged by the engine of the TMFL during forklift operation. Thus, it is preferred that the devices that are mounted to and/or connected to the transported equipment 40 described herein do not include a separate rechargeable or other type of battery. Instead, the receiver 32 and the transported equipment 40 lights are directly powered by the existing battery 34 or other power source of the demountable, transported equipment 40. The existing battery or other power source is the battery or power source that conventionally powers the starting motor of an internal combustion engine-powered forklift, or the power source that powers an electric vehicle forklift (for any electric vehicle (EV) TMFL). The receiver 32 is designed to be permanently connected to the wiring harness and/or central computer of the transported equipment 40, although this is not required if another manner of actuating the lights of the transported equipment 40 is available. The transmitter 10 is directly powered by the power source of the transport vehicle 20.

Figure 8:
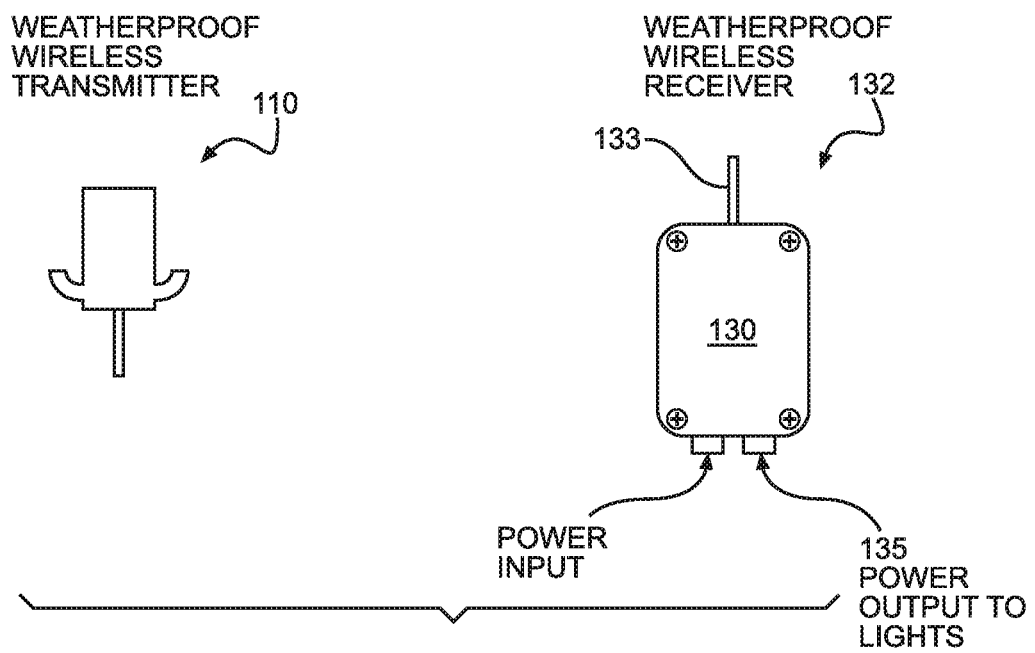
FIG. 8 is a schematic view illustrating a second embodiment of the components of the wireless transmitter and wireless receiver of the present invention.

In another embodiment shown in FIG. 8, the wireless signal receiver 132 may be mounted inside, or integrated into, a weathertight compact container 130 with a wireless antenna 133 mounted on an exterior of the container 130 to minimize obstruction of the antenna by the container 130. The receiver 132 may be installed inside of a compartment of a TMFL or on a strategically located exterior surface of the TMFL. The receiver 132 is thereby able to receive a signal from the transmitter 110 and the receiver 132 can output corresponding electrical power via weatherproof connectors 135 to supply appropriate power to corresponding, existing lights that are mounted on the transported equipment 40 (TMFL).

For all embodiments, the power supply that powers the lights of the transported equipment 40 that are actuated as a result of the receiver 32 receiving a signal is preferably the transported equipment's battery 34, which is most commonly 12 volt DC (VDC). Recharging of this battery 34 occurs when the transported equipment 40 is dismounted from the transport vehicle 20 and its engine is running so that it can perform its typical tasks. If the transported equipment is an electric vehicle (EV), the battery 34 or other power supply powers the lights as actuated by the signal received by the receiver.

The wireless lighting system described herein may be automatically engaged when the transported equipment 40 is mounted on the transport vehicle 20, such as by a proximity sensor, a signal sent to the receiver 32 when the TMFL is mounted in position, or an equivalent technology. In one embodiment, a normally closed relay is used to prevent power from being supplied to the receiver 32 anytime the engine of the transported equipment 40 is in operation. This prevents any signals transmitted by the transmitter 10 from being received and acted upon by the receiver 32 when the TMFL engine is operating. The normally closed relay supplies power from the battery 34 to the receiver 32 whenever the TMFL engine is not operating. Once the apparatus 8 is engaged, the transported equipment's 40 rearwardly-facing brake, turn, running and reverse lights operate as actuated by the transport equipment's 20 inputs. The wireless lighting system may be fully and automatically disengaged when the transported equipment 40 is demounted from the vehicle. For example, the transported equipment 40 may disengage whenever its engine is running, as noted in the embodiment above using the normally closed relay, when its own wheels support its weight, whenever the transported equipment 40 is a predetermined distance from the transporting vehicle 20 or any other condition. Once disengaged, the transported equipment's 40 rearwardly-facing brake, turn, running and backup lights operate as actuated by the transported equipment's 40 lighting inputs, and the transport vehicle's 20 rearwardly-facing lights operate as normal. In some embodiments, the transport vehicle's rearwardly-facing lights operate as normal, but are simply blocked by the transported equipment 40 at times.

In one contemplated embodiment, during the operation of the engine of the transported equipment 40 (e.g., a forklift), a signal is sent by the forklift's engine computer to the wireless receiver 32 that the forklift 40 is in operation. During this time, the system either disables all reception of wireless signals by the receiver 32 or disables any effect of such received signals within the forklift 40, for example using software, logic circuits or any other means. This may, for example, include the halting all power to the receiver 32 while the engine of the forklift 40 is in operation, or other optional steps. Until the forklift 40 is returned to the transport position on the transport vehicle 20, the forklift's 40 receiver capability is disabled, or at least any effect by the signals received by the receiver 32 on the lights of the forklift is disabled. This not only reduces the load on the forklift's 40 charging system, but it prevents signals from the transport vehicle's 20 lighting system from being transmitted to the forklift 40 and actuating the lights of the forklift 40 while the forklift is working on the site, which could be misinterpreted by others around the forklift 40 and create a safety problem. Once the forklift 40 is back in the transport position on the transport vehicle 20 and the forklift engine is shut off, preferably the normal activity of the receiver 32 is automatically reactivated to resume the operation of the lights and signals as described herein when the forklift is being transported by the transport vehicle 20.

In a preferred embodiment, the power output to the receiver 32 is constructed of a weatherproof plug that can output appropriate voltage to all lights and signals on the transported equipment 40. With the use of LED (light emitting diode) lights becoming more widespread and the cost of LEDs becoming more affordable, it is contemplated that transported equipment 40 may have all LED type transport lights or converted to LED type to minimize electrical power use, allow for long battery life and reduce the load requirements of the wireless receiver.

Operation of the apparatus described above may proceed as follows. A first vehicle, which may be the transport vehicle 20, has rearwardly-facing lights as part of its lighting system. A second vehicle, which may be the transported equipment 40 (e.g., a forklift), has an electrical power source (such as the starting motor battery 34) and rearwardly-facing lights as part of its lighting system. The forklift is positioned on the transport vehicle 20 with the forklift's weight supported by the transport vehicle 20 and at least a portion of the forklift placed over at least one of the transport vehicle's rearwardly-facing lights. The forklift's rearwardly-facing lights point in a direction that is similar to the direction that the transport vehicle's 20 rearwardly-facing lights face, such as directly behind the transport vehicle 20.

The transport vehicle 20 begins to drive and then the driver applies the brakes of the transport vehicle 20. Applying the brakes actuates the transport vehicle's rearwardly-facing brake lights that at least a portion of the forklift blocks. Upon applying the brake pedal, the wireless transmitter 10 connected to the transport vehicle's 20 lighting system transmits a wireless signal to the receiver 32 that is connected to both the forklift's lighting system and the forklift's power source, such as the battery 34. Upon receipt of the wireless signal, the receiver 32 connects the forklift's power source to at least one corresponding rearwardly-facing light on the forklift, which makes the corresponding (i.e., the light actuated corresponds to the light lighted in the transport vehicle) rearwardly-facing light on the forklift visible to drivers behind the forklift. Upon removal of the force to the brakes of the transport vehicle, the transmitter ceases to signal and the brake light on the forklift ceases to be lighted. This occurs with other rearwardly-facing lights during the trip. The forklift is then removed from the transport vehicle 20, at which time the connection between the lighting systems of the vehicles is disconnected, or temporarily disabled, while the forklift is in use. The disconnection may be manually actuated, or it may be automatic, such as by the normally closed relay cutting off power to the receiver 32 as soon as the engine of the forklift begins operating.

While the present invention has been shown and depicted and fully described above with detail, this description includes future variations, designs and models, not limited by size, material, shape, form or improved functionality. Any future variations, designs, or models built, constructed, and functioning under the same principles described above, are contemplated. Assembly and use may be made without departing from the principles and concepts set forth herein.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An apparatus connecting a lighting system for rearwardly-facing lights on a first vehicle to a lighting system for rearwardly-facing lights on a second vehicle, wherein the first vehicle supports the weight of the second vehicle and at least a portion of the second vehicle blocks at least one rearwardly-facing light of the first vehicle, the apparatus comprising:
   (a) a wireless transmitter electrically connected to the lighting system of the first vehicle; and
   (b) a wireless receiver electrically connected to the lighting system of the second vehicle and an electrical power supply of the second vehicle;
   wherein the wireless transmitter is configured to transmit a wireless signal to the wireless receiver when the at least one rearwardly-facing light of the first vehicle is actuated to light, and the wireless signal uniquely identifies the at least one rearwardly-facing light of the first vehicle;
   wherein the wireless receiver is configured to, upon receipt of the wireless signal, electrically connect the power supply of the second vehicle to a rearwardly-facing light on the second vehicle that corresponds to the at least one rearwardly-facing light of the first vehicle.

2. The apparatus in accordance with claim 1, wherein the wireless transmitter is contained in a housing that is disposed in a trailer lighting socket on the first vehicle.

3. The apparatus in accordance with claim 1, wherein the rearwardly-facing lights on the first vehicle include at least turn signals, tail lights, brake lights, and reverse lights.

4. The apparatus in accordance with claim 1, wherein the apparatus is configured to electrically disconnect the power supply of the second vehicle to rearwardly-facing lights on the second vehicle when the portion of the second vehicle no longer blocks at least one rearwardly-facing light of the first vehicle.

5. The apparatus in accordance with claim 1, wherein the apparatus is configured to electrically disconnect the power supply of the second vehicle to rearwardly-facing lights on the second vehicle when an engine of the second vehicle is operating.

6. The apparatus in accordance with claim 1, wherein the apparatus is configured to electrically disconnect the power supply of the second vehicle to rearwardly-facing lights on the second vehicle when the second vehicle is spaced more than a predetermined distance from the first vehicle.

7. A method of operating a combination of a first vehicle, which has rearwardly-facing lights as part of a first vehicle lighting system, and a second vehicle, which has an electrical power source and rearwardly-facing lights as part of a second vehicle lighting system, the method comprising:
  (a) positioning the second vehicle on the first vehicle, wherein:
    1) the second vehicle's weight is supported by the first vehicle; and
    2) at least a portion of the second vehicle is placed over at least one of the first vehicle's rearwardly-facing lights with the second vehicle's rearwardly-facing lights pointed in a direction that the first vehicle's rearwardly-facing lights face;
  (b) actuating the at least one of the first vehicle's rearwardly-facing lights that at least a portion of the second vehicle is placed over, thereby causing a wireless transmitter connected to the first vehicle lighting system to transmit a wireless signal to a receiver that is connected to both the second vehicle lighting system and the second vehicle's power source; and
  (c) connecting the power source, upon receipt of the wireless signal by the wireless receiver, to light at least one corresponding rearwardly-facing light on the second vehicle.

8. The method in accordance with claim 7, further comprising preventing the connecting step when the weight of the second vehicle is not supported by the first vehicle.

9. The method in accordance with claim 7, further comprising inserting a housing that contains the wireless transmitter into a trailer lighting socket on the first vehicle.

10. An apparatus for connecting a lighting system for rearwardly-facing lights on a first vehicle to a lighting system for rearwardly-facing lights on a second vehicle, wherein the first vehicle supports the weight of the second vehicle and at least a portion of the second vehicle blocks at least one rearwardly-facing light of the first vehicle, the apparatus comprising:
  (a) a wireless transmitter configured for electrically connecting to the lighting system of the first vehicle; and
  (b) a wireless receiver configured for electrically connecting to the lighting system of the second vehicle and an electrical power supply of the second vehicle;
  wherein the wireless transmitter is configured to transmit a wireless signal to the wireless receiver when the at least one rearwardly-facing light of the first vehicle is actuated to light, and the wireless signal uniquely identifies the at least one rearwardly-facing light of the first vehicle;
  wherein the wireless receiver is configured to, upon receipt of the wireless signal, electrically connect the power supply of the second vehicle to a rearwardly-facing light on the second vehicle that corresponds to the at least one rearwardly-facing light of the first vehicle.

\* \* \* \* \*